Feb. 16, 1943. A. MURRAY 2,311,071
HALFTONE SCREEN
Filed Jan. 12, 1942
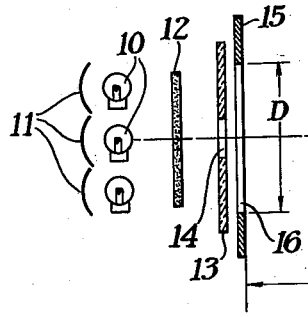
FIG. 1.
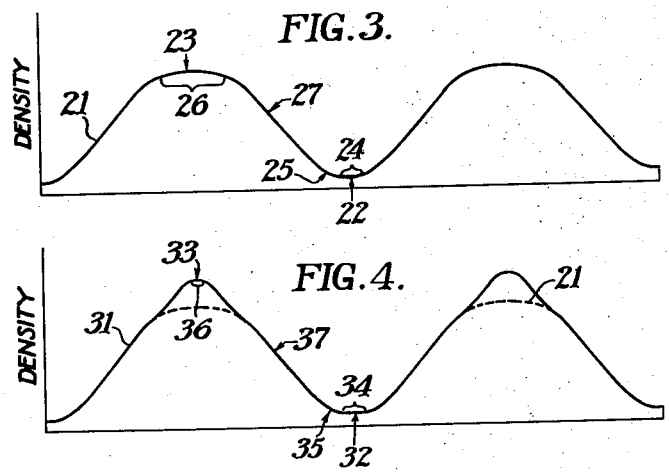
FIG. 3.
FIG. 4.
FIG. 5.
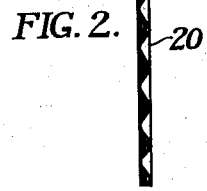
DEVELOPMENT TO A
TRANSPARENT
DYE IMAGE
FIG. 2.
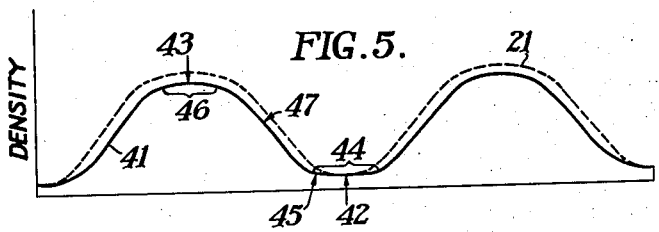
FIG. 6.
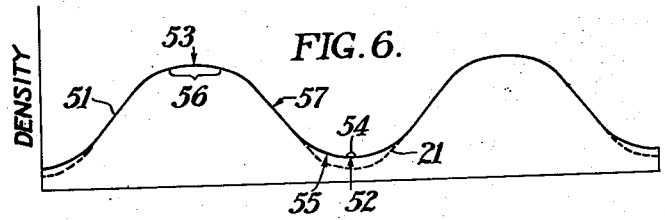
FIG. 7.
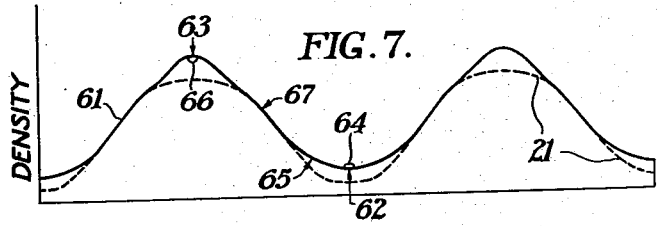
ALEXANDER MURRAY
INVENTOR
BY Newton M. Perrins
ATTORNEY Patented Feb. 16, 1943

2,311,071

UNITED STATES PATENT OFFICE 2,311,071

HALFTONE SCREEN

Alexander Murray, Rochester, N. Y., assignor to Eastman Kodak Company, Rochester, N. Y., a corporation of New Jersey Application January 12, 1942, Serial No. 426,494

8 Claims. (Cl. 95—81)

This invention relates to halftone screens such as used in photo-mechanical reproduction and to a process for making such screens.

This is a continuation in part of my application Serial Number 330,567 filed April 19, 1940.

It is an object of the invention to provide a halftone screen which is capable of giving better quality than hitherto available.

It is a particular object of the invention to provide a contact halftone screen giving even better quality than ordinary halftone screens.

It is also an object of the invention to provide a contact screen which is particularly adapted for use in the process described in a copending application Serial No. 330,566 filed April 19, 1940, by J. A. Yule.

It is an object of the preferred embodiment of the invention to provide a contact screen which results in satisfactory picture contrast and tone reproduction in the shadows as well as in the middle tones, and also to provide a method of making such a screen.

It is also an object of the invention to provide a contact screen which will give satisfactory and uniform definition even when dust particles get between the screen and the sensitive surface. It is an object of one embodiment of the invention to provide a screen having all of these characteristics and which will not cause interference patterns when placed in contact with a smooth surface.

According to the invention, a contact halftone screen is made up in which the elements consist of a non-diffusing coloring material such as a transparent colored dye and are graded substantially continuously in density from the centers to the edges thereof. "Diffusing" is here used in connection with optical properties and the coloring material must be non-light diffusing to a degree exactly defined below. In a preferred embodiment of the invention, the density gradation across each element does not decrease appreciably as the region of greatest density is approached which is termed the "center" of the dot (except, of course, right at and immediately adjacent to the center whereat the gradient is zero).

The exact mathematical definition of nondiffusing is given near the end of this specification.

I have found that a screen of this type is not only superior to any contact screen made of a silver or pigmented gelatin image but even gives quality much superior to that obtained with regular cross lined screens. "Pigmented gelatin" as used here has the usual meaning and refers to layers having a matte or light diffusing effect; if one were to select a pigment vehicle having the same refractive index as the pigment so as to eliminate diffusion a screen according to the invention could be made, but all prior pigmented gelatin screens were diffusing and hence were never commercially successful. In fact, due to the improved sharpness, a 133 line per inch screen according to the invention gives halftone prints which look as good as those made through a regular screen of 175 lines per inch. It is realized that nondiffusing regular (non-contact) screens have been used, but it has been believed that the reason for this would disappear when one changes to contact screens. On the other hand I have found that nondiffusing contact screens give superior results to any ordinary screen whether diffusing or not. In thus overcoming some of the disadvantages of contact screens, my invention permits their advantage to be realized—namely shorter exposures due to the larger apertures permissible, convenience, etc.

Another advantage of a nondiffusing contact screen is that the unevenness caused with ordinary contact screens when dust gets in and spoils the contact of the sensitive material is greatly reduced. In fact, the clarity of the screen permits it to be separated, by roughening either or both of the surfaces of the screen, from the sensitive material or the negative or from a glass plate sufficiently to prevent interference patterns. Incidentally I have found that although the greatest sharpness is obtainable only when care is exercised to insure that the elements of the screen consist entirely of a nondiffusing dye image as defined, the slight roughening of the surface thereof to prevent interference patterns apparently has negligible, if any, effect on the resolving power of the image. Of course, the roughening must be kept to a minimum and should not in any case be sufficient to give the surface a matte or semi-matte appearance.

Referring to one embodiment of the invention a screen having these desirable characteristics is made by placing a photo-sensitive layer in a camera, preferably with the lens removed, and at a suitable distance behind any ordinary halftone screen such as a geometrical screen of the ruled type. Exposure of the layer through the screen to a uniformly illuminated aperture and development of the layer to a transparent dye image by using suitable color-forming developers or toners, results in a screen of the desired type. An embodiment which is preferred when the screen is to be used in making positives from continuous tone negatives involves an additional exposure of the layer before development. This additional exposure is to add density to the densest portions of the screen; the contrast in the shadows of the pictures made with this screen is thereby prevented from going too high. The steeper the density gradient across each screen element, the less is the contrast of the halftone negative or positive made through that screen. The whole exposure may be made either by two consecutive exposures, one through the whole aperture and the other through a central portion only or by placing a filter, for example a neutral filter, over the aperture with the center of the filter cut away or punched out. That is, at least part of the exposure is to light which is more intense in the center of the aperture than at the edges thereof.

The additional center exposure has not previously been proposed in connection with any contact screens, but similar procedures have been adopted in making halftone negatives through ordinary ruled screens. Hence no claims are made to this feature or the preferred embodiment of my invention except in connection with the invention itself, i. e., a combination with the transparent dye feature which is the characteristic which gives the present invention its highly desirable properties. The invention is here described particularly with reference to screens to be used in making halftone positives from continuous tone negatives. However, it is also applicable to screens for making negatives from continuous tone positives. In the latter case, the centers of the dots affect the highlights of the final pictures and the additional center exposure is almost unnecessary and if given, should be considerably less than for screens to be used in the making of positives. Furthermore, when the screen is to be used for making positives the regions near the corners of the dots can also be corrected in accordance with the method proposed by Yule in another copending application Serial No. 330,565, also filed April 19, 1940. Yule's use of a flash exposure to get the effect of an extremely long toe emulsion can be replaced by a procedure using ultra violet light for the main exposure since this gives the same long toe effect. The corners of the dots are the points of least density.

Other objects and advantages of the invention will be apparent from the following description when read in connection with the accompanying drawing in which:

Fig. 1 illustrates one method of making a screen according to the invention.

Fig. 2 shows diagrammatically the cross section of a screen made according to Fig. 1.

Fig. 3 is a graph showing the distribution of density in one element of a contact halftone screen.

Fig. 4 shows the distribution of intensity in the element of a screen in the preferred embodiment of the present invention.

Figs. 5, 6, and 7 show the density distribution in screen elements in which the density distribution at the corners of the dots is also corrected.

In Fig. 1, a bank of lamps 10 with or without suitable reflectors 11 illuminate the diffusing medium 12 such as a ground glass or opal glass. A single lamp and ground glass is not preferred because the diffusion of the ground glass is not great enough. A single lamp or bank of lamps works satisfactorily with an opal glass for the diffusing plate 12, but I preferably employ four lamps placed at the corners of a square and a ground glass. Any of these arrangements give a uniform distribution of light over a diaphragm opening 16 which may be square, round or oblong. Light from this source (10, 11, 12) illuminates the diaphragm 15 having this aperture 16 whose width is D and through this aperture exposes a photosensitive layer 18. The four lamp formation gives a substantially uniform distribution of light at the film 18 because actually the aperture 16 is small compared to the lamps 10 so that through the aperture 16, each lamp tends to send more light toward the corners than toward the center of the film 18. This compensates for the falling off of illumination due to the greater distance from the aperture 16 to the edges of the film. Of course, the effect is small due to the diffusion of the ground glass 12. The distribution of light over the aperture 16 determines the intensity distribution in each element of the shadow of the screen 17 and the distribution of light coming from the ground glass 12 which in practice may be larger than the aperture 16 and back some distance from it determines the intensity distribution over the whole image on the film; this latter effect may be controlled and reduced slightly by moving the ground glass toward the aperture and satisfactory results are obtained with it right at the aperture.

An ordinary cross-line screen 17 whose interval S is made up of lines and openings preferably of equal width is placed a distance K in front of the layer 18 to cast a shadow thereon. The actual value of K generally does not correspond to that calculated by simple geometry due to the diffraction and other phenomena; it is known that K should be greater when high contrast emulsions are used. K is usually between $$\frac{SL}{4D} \text{ and } \frac{SL}{D}$$

and preferably between $$\frac{SL}{3D} \text{ and } \frac{SL}{2D}$$

where L is the distance between the diaphragm 15 and the layer 18. The dimensions of D, S, and K are obviously greatly exaggerated in the drawing relative to the other elements.

This exposure to a shadow image causes a distribution of density over each element of the screen as represented in Figs. 3 and 4. After development of the layer 18 by suitable methods to be described below, to a transparent dye image there results a non-diffusing dye image screen 20 shown enlarged in Fig. 2. The support for this screen 20 should be transparent and preferably colorless. The usual support is gelatin (with a glass or thin cellulose ester film backing, not shown).

The density distribution illustrated in Fig. 3 is perfectly satisfactory for most purposes. In fact the results obtained therewith are much superior to those with prior known screens. On the other hand, the tone reproduction with this density distribution is not perfect and if the screen is to be used for making positives it is particularly desirable to have a screen of slightly different density distribution. In this figure, the curve 21 represents the cross section of two dots having corners at the point 22 and a center of a dot at the point 23. In the region 26 near the center of the dot the density gradient is flat which results in high contrast in the shadows of a positive made through this screen. The difference in density between the point 23 and the point 22 is adjusted so that the average gradient gives the correct contrast in the middle tones controlled by the point 27. Therefore, it is not satisfactory to increase the contrast in the region 26 by increasing the development. Therefore, according to the preferred embodiment of the invention wherein the additional exposure is given through the small aperture 14, the centers of the dots receive additional exposure so that the density as represented by the point 33 on the curve 31 is considerably higher when the screen is developed to the same contrast as before. The region in the center of the dots over which the resulting contrast of the shadows is too high is reduced to a very small portion 36. The average gradient is of course the difference in density between the point 33 and the point 32. This average gradient should be between .9 and 2.0 and preferably about 1.4. In other cases and for certain printing processes, this extra center exposure is omitted or even replaced by reduced center exposure produced by having a black dot in the center of the aperture 16 for example, by mounting an opaque spot on the center of the ground glass.

To obtain one preferred embodiment of the invention, a neutral density 13 having an aperture 14 is placed concentrically over the aperture 16 of the diaphragm 15 during at least part of the exposure of the layer 18. Thus the regions of greatest density in the contact screen receive an additional exposure. Alternatively two consecutive exposures may be given one through the full aperture 16 and another through a smaller centrally located aperture. In either case, the density gradient of the screen in the densest portions is increased as illustrated in Fig. 4. Of course right at the point of maximum density 23 in Fig. 3 and 33 in Fig. 4, the density gradient is zero because the density decreases on both sides of this point. However, the region 26 is quite broad in Fig. 3 compared to the narrow region 36 in Fig. 4 and thus in Fig. 4, the density gradient in the region of greatest density is zero only at the center of this region (the center of one of the elements) and increases rapidly from this zero value to a high gradient as the region of average density is approached. Taking the point 22 as zero and the point 23 as unity on a distance scale along the diagonal of one dot, the relative gradient (i. e., the ratio of the gradient at any point to the average gradient of the dot) should be zero only at 0 and 1.0 on this scale. In Fig. 3 the relative gradient in the region 26 is low and at the .9 point of the scale is about .4 and at the .8 point is about .8 and at the .75 point is about 1. By the additional center exposure the relative gradient at the .9 point is raised to .8 or even to considerably above 1 and at the .8 point to 1.4 or even to 1.8 or 1.9 which latter value has been found by Yule (mentioned above) to be ideal. This preferred form of the invention requires that the relative gradient of the .9 point be between .7 and 2 and at the .8 point between 1.2 and 2.2, but the embodiment with reduced center exposures has much lower values, of course.

Figs. 5, 6, and 7 illustrate a method of correcting the tonal quality near the corners of the dot. In both Figs. 3 and 4 the region 24 and as far out as the region 25 (and similarly regions 34 up to 35), have too great a gradient. Attempts to correct this by underexposing the film as shown in Fig. 5 do manage to bring the gradient at the point 45 down. However, there results a broad region 44 over which the gradient is practically zero, whereby extreme contrast is given to the highlights of a print. Either with or without the underexposure of Fig. 5, the film may be exposed by ultra violet or given an overall flash which has the effect of extending the toe of the characteristic curve of the emulsion used so that the distribution has that shown in Fig. 6 by curve 51. Combining this feature with the preferred embodiment of the present invention, gives the results shown by the curve 61 in Fig. 7.

The density distribution is shown by the curves 21, 31, 41, 51, and 61. The centers of the dots are shown by the points 23, 33, 43, 53, and 63; the corners by the points 22, 32, 42, 52, and 62, and the regions of average density by the arrows 27, 37, 47, 57, and 67. The density distribution in the regions 26, 46, and 56 are substantially identical. The density distribution in the regions 36 and 66 are also identical incorporating the preferred embodiment of the present invention. The density gradient in the regions 24 out to 25 and 34 out to 35 is too great as pointed out above. On the other hand the gradient over the region 44 is too small except from the point 45 out. The gradient is not zero even over the small regions 54 and 64 but is low and changes slowly out to the points 55 and 65.

When the photosensitive surface 18 has received the exposure shown in Fig. 1 or the simple exposure corresponding to Fig. 3 (or any of the preferred methods of exposure illustrated in Figs. 4 to 7) it may be developed to give a screen according to the invention by any suitable process of developing to a nondiffusing dye image. In general, I prefer to use these methods of processing which result in a transparent dye image such as used in color photography. For example, if a magenta screen is desired, the layer 18 may be developed in any color forming developer containing a coupling developing agent and a magenta forming coupler. If a primary red screen is desired the developer may contain equal or effectively equal amounts of magenta forming coupler and yellow forming coupler which have approximately equal activity. If one of the couplers is slightly more active than the other, this may be compensated for by increasing the amount of the other coupler. The relative amounts required also depend of course on the developer used; with a p-aminodiethylaniline HCl developer, two parts of parabenzoylacetaminobenzene sulfonamide coupler to five parts of 1-paranitrophenyl-S-methyl-5-pyrazolone coupler form a satisfactory red screen. Although, for certain purposes certain colors are more desirable than others, the present invention can be practiced more or less acceptably with practically any color.

Since absolute absence of diffusion is impossible in nature and since the present screens are "nondiffusing" only relative to previous screens, an exact mathematical definition will be given here. The usual Collier coefficient (the ratio of specular density to diffuse density) is not an appropriate measure for the present invention since a large amount of light deviated and spread over a small angle is quite harmless in contact screens whereas even a relatively small amount of light scattered or diffused 45° say has been found by me to be the cause of many of the troubles of prior screens. Therefore in defining my screens I use the factor termed "the diffuse brightness ratio of 45°." Of course the actual angle chosen is not important as long as it is between 10° and something less than 90° and as long as one adheres to one convention in all comparisons. Throughout this specification I use the factor just quoted.

To measure the "diffuse brightness at 45°" I employ a circular light source of such diameter that it subtends an angle of 10° at the sample. The sample brightness at 45° is divided by the perpendicular brightness of the source with the sample removed. Since "brightness" is an exactly defined term in photometry the type of meter used is not critical.

A red (primary red) screen made in the above described manner starting with "Microfile" or similar fine grain film has a diffuse brightness ratio at 45° of .000020. The magenta example has a value of about .00003. Any dyes giving a value less than .00005 result in the preferred form of screen. Commercially available color film exposed by white light to give a neutral gray has a value between .00015 and .0002 which is about the upper limit if a commercially useful screen is to be obtained. The best possible prior screens ranged from .00035, to .001 and higher and of course looked very translucent. Multiplying these values by a factor of $10^5$ to emphasize the distinctions, prior screens diffuse over 35 such units whereas the present screens are less than 20 preferably less than 5 units. The red screen example would have 2 such units diffusivity, i. e., has a diffuse brightness ratio of $2 \times 10^{-5}$.

Of course, for colored screens the brightness both of the sample and the source are measured through filters more or less complementary to the color of the screen, the exact color of the filter not being critical.

Probably one of the main reasons that the need for low diffusivity has not previously been discovered is the presence of diffraction. The elements of any halftone screen (ruled or contact type) act like the elements of a diffraction grating to give an apparent diffusion over very small angles. In fact, the operation of ruled (spaced) screens depends on this diffraction phenomenon. When one looks through any halftone screen, for example, at a printed page, the printing becomes quite blurred unless the screen is right near the page or right near the eye. This is well known. It is due partly to pure diffusion of the material in the screen elements and mainly to diffraction. This effect remains even when pure diffusion is practically entirely eliminated as by my invention, but this effect is harmless whereas pure diffusion (as measured by diffuse brightness ratio at 45°) has been found to cause poor definition even with contact screens.

Whether one uses a "transparent" material according to the invention or a slightly diffusing material such as pigmented gelatin to make the elements of a contact screen, the resulting screen appears diffusing (due to diffraction) when viewing objects directly therethrough. Thus, the important property of my screens is not apparent from this type of casual visual observation. The property is revealed if samples of the material are made up to uniform density (rather than in screen form) so that no diffraction is present, but better still the diffuse brightness ratio at 45° measures the property whether the material is distributed uniformly or as in an actual screen. At 45° diffraction effects are negligible.

Having thus described several embodiments of my invention and some of the major advantages thereof, I wish to point out that it is not limited to these arrangements but is of the scope of the appended claims.

What I claim and desire to secure by Letters Patent of the United States is:

1. A contact halftone screen comprising elements graded substantially continuously in density from the centers to the corners thereof and a transparent support for the elements, which screen has a diffuse brightness ratio at 45° less than .0002.

2. A contact halftone screen according to claim 1 in which at least one of the surfaces of the screen is very slightly roughened to prevent optical interference patterns when the screen is placed in contact with a smooth surface.

3. A contact halftone screen according to claim 1 in which the diffuse brightness ratio is less than .00005.

4. A contact halftone screen comprising halftone elements of a color dye graded substantially continuously in density from the centers to the corners thereof and a transparent support for the elements, which screen has a diffuse brightness ratio at 45° less than .00005.

5. A contact halftone screen according to claim 4 in which the density gradient in the region of greatest density is zero only at the center of said region and varies rapidly from zero to a high gradient.

6. The method of making a contact halftone screen, comprising placing a fine grain photosensitive layer a distance L behind the diaphragm having an aperture of diameter D therein, placing an ordinary halftone screen whose interval is S a distance K in front of the layer where K has a value between $$\frac{SL}{4D} \text{ and } \frac{SL}{D}$$

exposing the layer through the aperture, at least part of the exposure being to light which is more intense in the center than near the edges of the aperture and developing the layer in a fine grain color developer to a dye image with a diffuse brightness ratio at 45° less than .00005.

7. A contact halftone screen according to claim 4 in which the relative gradient at a point .9 of the way from the corner to the center of each dot is between .7 and 2 and at a point .8 of the way is between 1.2 and 2.2.

8. A contact halftone screen comprising elements which consist of low diffusivity coloring material and which are graded substantially continuously in density from the centers to the corners thereof and a transparent support for the elements, at least one of the surfaces of the screen being very slightly roughened to prevent optical interference patterns when the screen is placed in contact with a smooth surface.

ALEXANDER MURRAY.